US011653202B2

United States Patent
Balmakhtar et al.

(10) Patent No.: US 11,653,202 B2
(45) Date of Patent: *May 16, 2023

(54) FIFTH GENERATION (5G) EDGE APPLICATION AUTHENTICATION

(71) Applicant: T-Mobile Innovations LLC, Overland Park, KS (US)

(72) Inventors: Marouane Balmakhtar, Fairfax, VA (US); Galip Murat Karabulut, Vienna, VA (US)

(73) Assignee: SPRINT COMMUNICATIONS COMPANY, L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,199

(22) Filed: Apr. 11, 2022

(65) Prior Publication Data

US 2022/0240087 A1    Jul. 28, 2022

Related U.S. Application Data

(63) Continuation of application No. 17/074,581, filed on Oct. 19, 2020.

(51) Int. Cl.
*H04W 12/06* (2021.01)
*H04W 12/08* (2021.01)
*H04L 9/32* (2006.01)

(52) U.S. Cl.
CPC .......... *H04W 12/06* (2013.01); *H04L 9/3213* (2013.01); *H04W 12/08* (2013.01)

(58) Field of Classification Search
CPC combination set(s) only.
See application file for complete search history.

(56) References Cited

U.S. PATENT DOCUMENTS

| | | | |
|---|---|---|---|
| 8,316,461 B2 * | 11/2012 | Chang | H04L 63/0428 713/169 |
| 9,646,165 B1 * | 5/2017 | Saylor | E05B 49/00 |
| 10,229,548 B2 * | 3/2019 | Daniel-Wayman | G07C 9/23 |
| 11,337,065 B1 | 5/2022 | Balmakhtar et al. | |

(Continued)

OTHER PUBLICATIONS

Office Action dated Sep. 16, 2021, U.S. Appl. No. 17/074,581, filed Oct. 19, 2020.

(Continued)

*Primary Examiner* — Amal S Zenati

(57) ABSTRACT

A method for edge network authentication and access, implemented by an edge server, including receiving user equipment (UE) information from an application client executed on a UE to establish a connection between the edge server and the UE, verifying whether the UE has authorization to the local access point name (APN) based on the UE information, generating a session key when the UE has authorization to the local APN, sending the session key to the UE, receiving a request to access content of an application on a content server from the UE, decrypting the information to obtain a key, comparing the key with the application key to validate the UE, verifying identifiers of the UE when the UE is valid, identifying the application on the content server to obtain the content based on the request, encrypting and sending a session identifier to the UE based on a new application key.

20 Claims, 7 Drawing Sheets

(56) References Cited

U.S. PATENT DOCUMENTS

| | | | |
|---|---|---|---|
| 2013/0212248 A1* | 8/2013 | Neafsey | H04L 63/102 709/223 |
| 2013/0305319 A1* | 11/2013 | Matthews, III | H04W 12/08 726/4 |
| 2016/0055699 A1* | 2/2016 | Vincenti | H04W 12/04 340/5.61 |

OTHER PUBLICATIONS

Notice of Allowance dated Jan. 21, 2022, U.S. Appl. No. 17/074,581, filed Oct. 19, 2020.

* cited by examiner

FIFTH GENERATION (5G) EDGE APPLICATION AUTHENTICATION

CROSS-REFERENCE TO RELATED APPLICATIONS

This application is a continuation of and claims priority under 35 U.S.C. § 120 to U.S. patent application Ser. No. 17/074,581 filed on Oct. 19, 2020, entitled "Fifth Generation (5G) Edge Application Authentication" by Marouane Balmakhtar, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Applications on mobile communication devices directly communicate with a central server to request access to information, services, and content. The wireless communication devices establish a connection to a network and identify a domain name system (DNS) address of the central server. The central server authenticates clients prior to allowing the mobile communication devices access. The wireless communication devices may identify themselves to the central server with information specific to the wireless communication devices such as the international mobile subscriber identity (IMSI) and the media access control (MAC) identifier. When the request reaches the central server, the central server authenticates the information by comparing the information of the wireless communication devices to a database. The central server directly sends the information, services, and content to the mobile communication devices.

SUMMARY

In an embodiment, a method for edge network authentication and access, implemented by an edge server, including receiving user equipment (UE) information from an application client executed on a UE to establish a connection between the edge server and the UE, wherein the UE information includes unique attribute information based on the UE, and wherein the edge server is located at a local access point name (APN), verifying whether the UE has authorization to the local APN based on the UE information, generating a session key when the UE has authorization to the local APN, wherein the session key comprises an application key that validates the connection between the edge server and the UE, sending the session key to the UE, receiving a request to access content of an application on a content server from the UE, wherein the request comprises encrypted information based on the application key, decrypting the encrypted information of the request to obtain a key, comparing the key with the application key to validate the UE, verifying a plurality of identifiers of the UE when the UE is valid, identifying the application on the content server to obtain the content based on the request, encrypting and sending a session identifier to the UE based on a new application key, and serving the content from an instance of the application on the content server to the UE according to the session identifier.

In another embodiment, an edge server, including at least one processor, a non-transitory memory, and an edge server application stored in the non-transitory memory that, when executed by the at least one processor receives user equipment (UE) information from an application client on UE to establish a connection between the edge server and the UE, wherein the UE information includes attribute information based on the UE, and wherein the edge server is located at a local access point name (APN), verifies whether the UE has authorization to the local APN based on the UE information, generates a session key when the UE has authorization to the local APN, wherein the session key comprises an application key that validates the connection between the edge server and the UE, sends the session key to the UE, receives a request to access content of an application on a content server from the UE, wherein the request comprises encrypted information based on the application key, decrypts the encrypted information of the request to obtain a key, compares the key with the application key to validate the UE, verify a plurality of identifiers of the UE when the UE is valid, identifies the application on the content server to obtain the content based on the request, encrypts and sending a session identifier to the UE based on a new application key, and serves the content from an instance of the application on the content server through to the UE according to the session identifier.

In yet another embodiment, user equipment (UE) for edge authentication and access, including a processor, and a non-transitory memory comprising instructions that, when executed by a processor authenticate that an application client on the UE has authorization to a network based on a status of the application client, send UE information from an application client on the UE to an edge server to establish a connection over the network between the UE and the edge server, wherein the UE information includes attribute information based on the UE, and wherein the edge server is located at a local access point name (APN), receive a session key from the edge server based on the application client, wherein the session key comprises an application key, encrypt information in a request to access content of an instance of the application on a content server from the UE, wherein encryption is based on the application key, send the request to the edge server, receive a session identifier comprising a new application key, verify the new application key is valid with the application client, and receive the content of the instance of the application on the content server from the edge server according to the session identifier.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
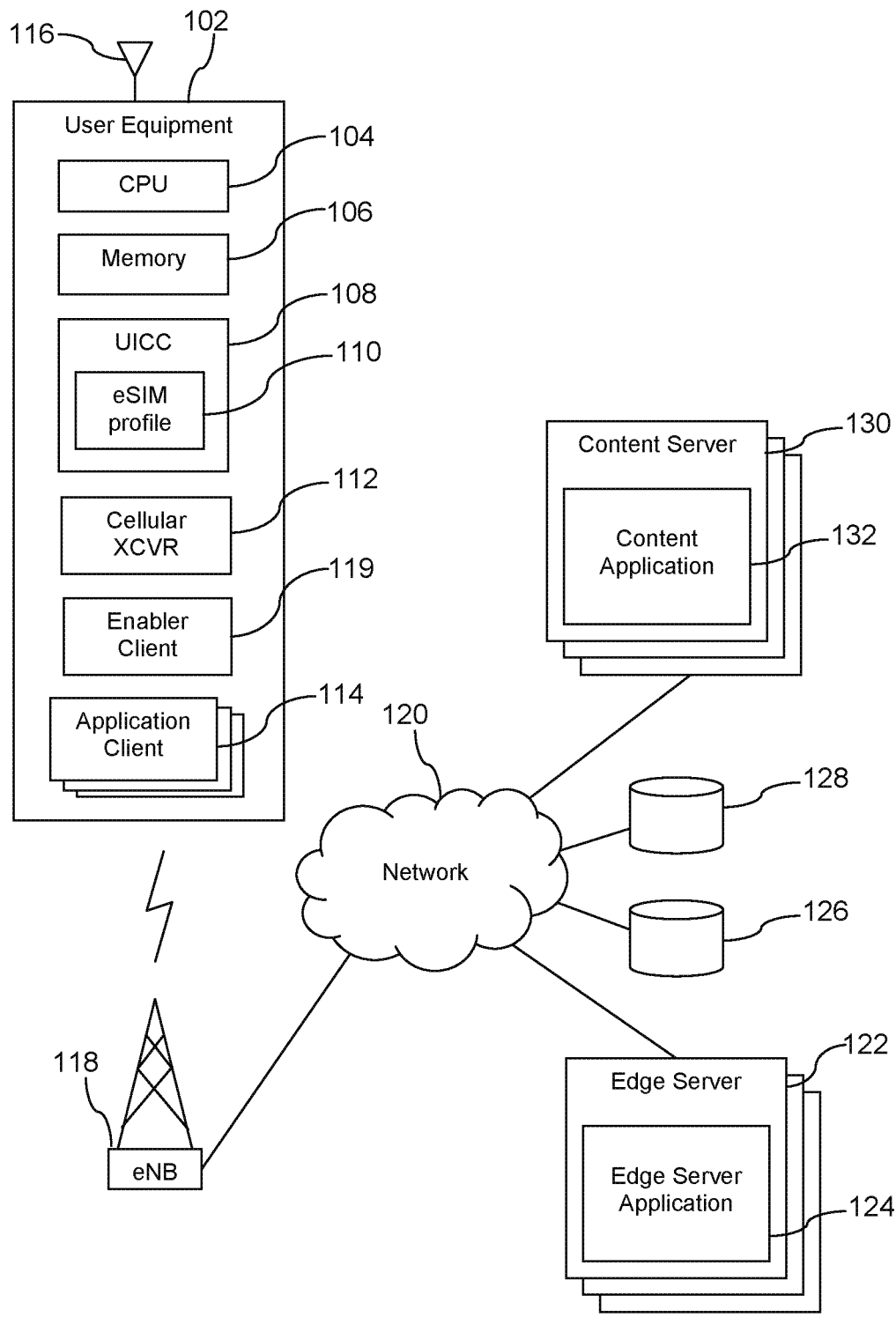
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Fifth generation (5G) wireless proposes to provide close to ubiquitous and instantaneous access to unlimited bandwidth, which will require high performance demands on the network. To provide these performance characteristics, it is anticipated that applications will need to depend heavily on edge computing by providing application servers physically proximate to end users (near the "edge" of the radio access network). In this scenario, there are expected to be tens, hundreds, perhaps even thousands of application servers proximate to the network edge. This can provide increased performance characteristics but poses a security challenge. Mobile network operators (MNOs) will charge fees to third parties for using application servers for their edge services, and as such the third party applications will need to exclude free-loaders such as applications operating on edge servers without being charged fees. Where an MNO provides wireless communications services and owns or controls all the elements necessary to sell and deliver services to an end user including radio spectrum allocation. The third party applications will need to rigorously authorize user access to their applications to monetize their application service to pay for the edge communication functionality.

Having user devices, e.g. UE, complete authorization transactions in the customary manner, such as reaching back to a server in the network core and having the server reach out to a backend database, does not support the high performance requirements of 5G. The authorization could be done at the edge by copying the subscription database out to databases located at the network edge, but this creates undesirable data synchronization problems and more importantly dramatically increases the number of locations vulnerable to malicious attacks.

The present disclosure proposes the edge server to create application keys for the UE to access content from a content application on a content server. When the edge server (in proxy for the MNO) creates a session key for the UE to gain access to the mobile network, the edge server also includes an application key which is contained within the session key. The UE uses the application key when it creates its own session keys. The application key may be a security token to access an application service from an edge server. A security token is used to gain access to an electronically restricted resource and may be used in addition to or in place of a password. In an embodiment, the UE may use an access and mobility management function (AMF) for generating the application key. The AMF is responsible for registration management, connection management, reachability management, mobility management and various functions relating to security and access management and authorization. When the UE attempts to obtain a communication session with the edge server, the UE presents its keys—which include the session key with the application key contained within it. If the key from the UE matches the key of the edge server, the UE is an authorized UE—not just authorized to access the radio access network but also to the content application on the content server. In some embodiments, this process may be accomplished in two steps, in the first step the session key is authenticated to enable network access and in the second step the application key is authenticated to authorize access to the relevant application. Further, this methodology may be applied to any number of applications.

Edge authentication and access may provide opportunities for MNOs to gain a competitive advantage. For example, MNOs with established cell towers can use the subscription data of their users to quickly authenticate the users for particular applications on their mobile phones, which would be a competitive advantage to influence third party application owners to launch applications on the MNO's network. As a specific example, the local network may become flooded during a sports event where many users are streaming applications on their mobile phones. The MNO of the local network may use the presently disclosed edge computing deployment to deliver a high user experience while providing more robust and convenient security to ensure user and network security. Ultimately, it is advantageous to establish authorize application access at the edge of the radio network because it is inefficient for UEs to directly communicate with back-end central servers and repetitiously authenticate its identity when accessing application services.

Edge authentication and access may also provide simpler network logistics for the application servers by shortening the normal operational path for the applications interacting with the UE residing on the application server at, or near, the edge. Instead of the application server regularly having to seek authentication or confirmation from the central servers—the application server also can short cut that process using the leveraged keys. In an embodiment, the application server may need periodic checks to confirm a given set of keys are valid, which might be a small risk that a longer verification process to propagate through the system. As a result of the edge authentication and access, the much more efficient response paths should both reduce the processing load on the application servers checking for both issues and the bandwidth occupied to the central servers on such checks.

In FIG. 1, a system 100 is described. In the system 100, UE 102 authenticates an application client 114 based on characteristics of the application client 114 such as version number, an identifier, and/or the like. The UE 102 is one of a mobile phone, a smart phone, a personal digital assistant (PDA), a wearable computer, a headset computer, a media player, a laptop computer, a notebook computer, or a tablet computer.

The UE 102 may comprise a central processing unit (CPU) 104, a memory 106, a universal integrated circuit card (UICC) 108, an embedded subscriber identity module (eSIM) profile 110, a cellular radio transceiver 112, application client 114, and an antenna 116. The UICC 108 comprises the eSIM profile 110. The eSIM profile 110 may comprise data including credentials such as confidential and encryption keys, that are used to establish a wireless link with the wireless network. The UE 102 communicates with a cell tower 118 through the antenna 116. The cell tower 118 may provide a wireless communication link to the cellular radio transceiver 112 according to various wireless protocols such as 5G, long term evolution (LTE), code division multiple access (CDMA), and global system for mobile communication (GSM). After authenticating the UE 102, the network authorizes communication with the UE 102. In turn, the cell tower 118 facilitates communication between the UE 102 and a network 120. The network 120 may include over-the-air (OTA) provisioning for initial or ongoing configuration, distribution of new software, or other provisioning of the UE 102. In this embodiment, the network 120 is localized to the region encompassing the UE 102 and so the network 120 comprises an edge of serviceability where an edge server 122 facilitates communication between the UE 102 and the content server 130.

The application client 114 is a computer application on the UE 102 that supports functionality of the UE 102 for an end user, for example, the application client 114 may be, for example, a streaming media service or other user applications whereby third party content is delivered to the user of the UE 102. Additionally, in an embodiment, an authentication server function (AUSF) may act as an authentication server for the application client 114. Further, in an embodiment, the UE 102 may rely upon a unified data management (UDM) to be responsible for creating authentication and key agreement (AKA) credentials, user identification handling, access authorization, and subscription management.

The edge server application 124 is a computer application on the edge server 122 associated with the application client 114 that supports the functionality of the UE 102 by providing services and information to the UE 102. The edge server 122 may be a computer server, the details of which are discussed further below. For example, the edge server application 124 may provide streaming services to the application client 114 on the UE 102.

The edge server 122 receives information from the UE 102 and determines whether the UE 102 has access to the specific local APN where the edge server 122 is located, and if so, the edge server 122 further authenticates whether the UE 102 has access to the edge server 122. For example, in an embodiment, the information from the UE 102 may include an Internet Protocol (IP) address of the UE. And in another example, in another embodiment, access to the edge server 122 may require a specific subscription associated with the UE 102, where an owner of the application client 114 may require edge access to distribute content at a higher bandwidth for the respective users of the application client 114. In another embodiment, the local APN may be a Data Network Name (DNN), where a DNN is a reference to a data network and may be used to select network functions. The edge server 122 verifies the identity of the UE 102 with a database 126 comprising user and subscription information. Verification may occur when the edge server 122 compares the identity of the UE 102 with the subscription information in the database 126. When the edge server 122 verifies that the UE 102 has access, then the edge server 122 generates and sends a session key comprising an application key corresponding to the application client 114. The application key is used by the edge server 122 ultimately to authenticate the UE 102. The UE 102 receives the session key and parses the information of the session key to obtain the application key. The UE 102 encrypts, based on the application key, a request that identifies the application client 114, the UE 102, and the content to be accessed from the content server 130. The request may include a Hypertext Transfer Protocol Secure (HTTPS) Uniform Resource Locator (URL) comprising the IP address in the information from the UE 102. The UE 102 sends the request to the edge server 122. The edge server 122 receives a request from the UE 102 and decrypts the request and obtains a key. The edge server 122 compares the key from the request to the application key originally sent to the UE 102 to validate whether the UE 102 can access the edge server 122. When the edge server 122 determines that the key from the request is correct, it then establishes communication with the content server 130 and sends the content server 130 the application key to access the content being requested. The content server 130 may be a computer server, the details of which are discussed further below. The content server 130 verifies the application key with a database 128 to further authenticate whether the UE 102 has access to the content server 130 based on the information provided by the edge server 122. The content server 130 comprises a content application 132 which pulls content from the database 128, where the content is being requested by the UE 102, and sends the content to the edge server 122. The content server 130 may be operated by the MNO or a third party, and runs the third party applications and content consumed by the UE 102 as discussed in the above examples. After the edge server 122 receives the content from the content server 130, the edge server 122 then serves the content to the UE 102.

In an embodiment, an enabler client 119 on the UE 102 may be used to validate the application client 114 when the UE 102 installs the application or when the application triggers or accesses services at the edge server 122. The enabler client 119 comprises a checksum or an application client attribute such as an application identification or application version. If the enabler client 119 comprises the checksum, then the checksum is stored when the application client 114 is installed. The enabler client 119 validates the application client 114 by comparing the checksum or the application client attribute with the checksum or the application client attribute from where the UE 102 originally downloaded the application. Checking the checksum or the application client attribute ensures the validity of the application. Generally, every application instance running on the UE that is communicating with the edge server 122 is an approved application. The enabler client 119 verifies the application comes from the right source or whether the application is from an illegitimate subscriber on the edge server or a legitimate subscriber with a corrupt version of the application.

In another embodiment, a centralized server may be controlled by an MNO to collect and store from each of the enabler clients of each of the UEs the checksum and/or the application client attribute of the application client 114. If the UE 102 is running an old version of the application client 114 that has not been updated and the checksum and/or the application client attribute is still valid, then the old version is acceptable and follows the validation technique discussed in this disclosure. Additionally, a central application key server may be controlled by an MNO and used to store and track all possible application keys on all edge servers to store the application keys as a central backup location.

Figure 2A:
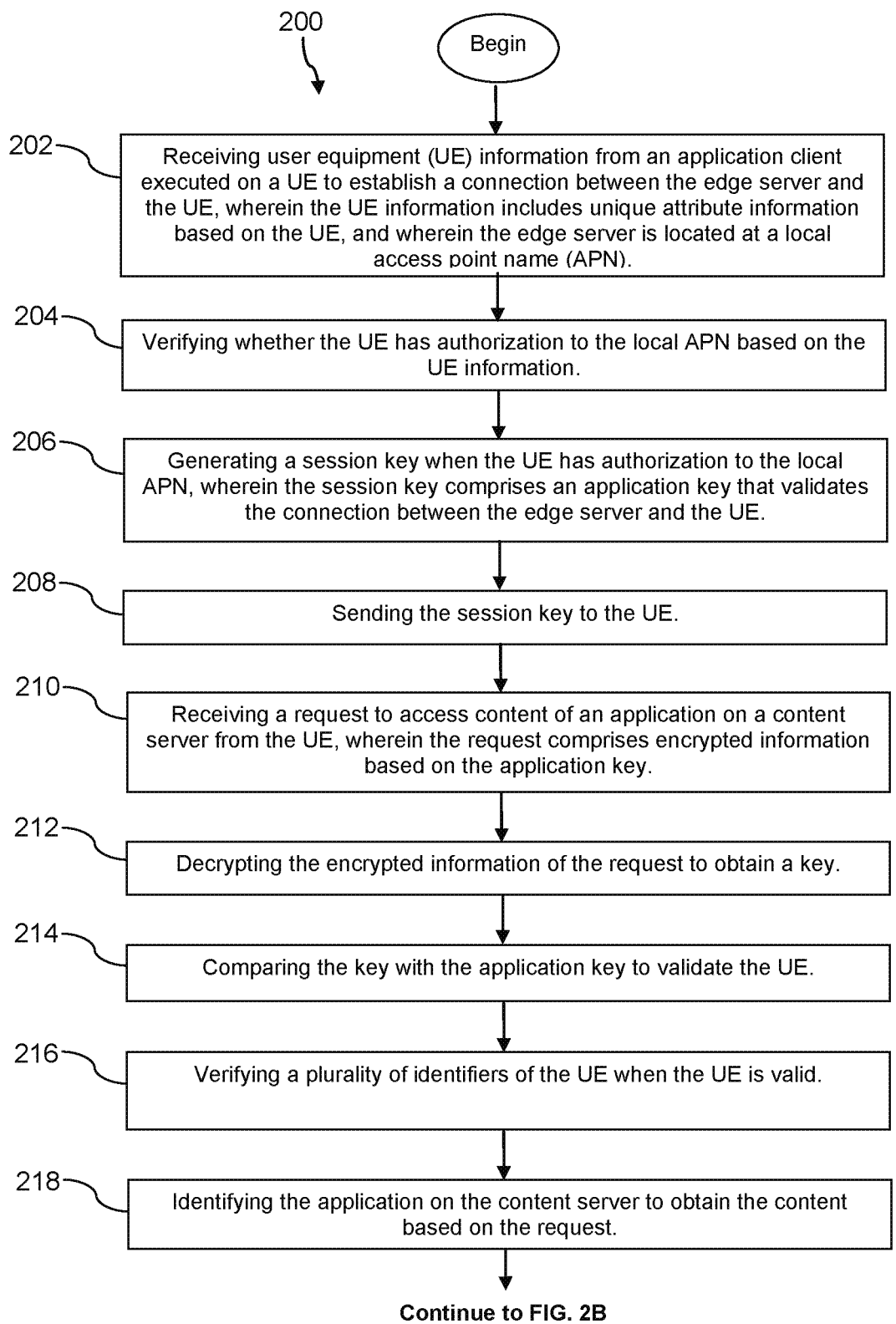
FIG. 2A is a flow chart of a method according to an embodiment of the disclosure.
Figure 2B:
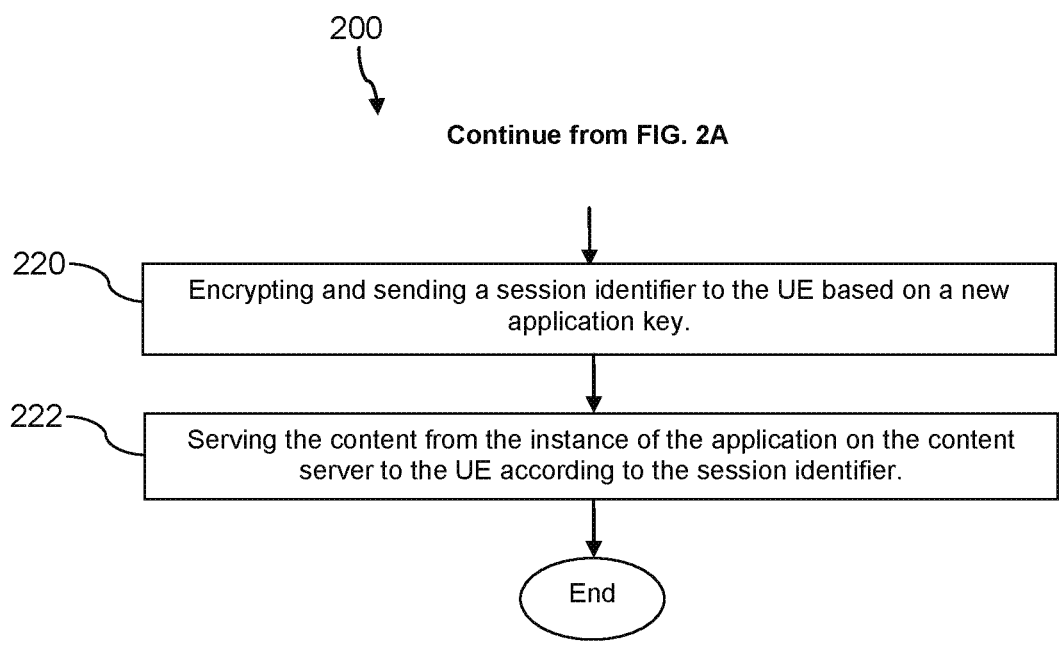
FIG. 2B is a continuation of the flow chart of a method according to an embodiment of the disclosure.

Turning now to FIG. 2A and FIG. 2B, a method 200 is described. In an embodiment, the method 200 is a method for edge network authentication and access, implemented by an edge server, such as edge server 122. At block 202, the method 200 comprises receiving UE information from an application client, such as application client 114, executed on UE such as UE 102, to establish a connection between the edge server and the UE, wherein the UE information includes unique attribute information based on the UE, and wherein the edge server is located at a local APN.

At block 204, the method 200 comprises verifying whether the UE has authorization to the local APN based on the UE information. As discussed above, this verification may be accomplished when the edge server compares the identity of the UE with the information on the database. For example, when edge server verifies the UE by comparing identifiers such as the International Mobile Equipment Identity (IMEI), IMSI, Unified Information Device (UID), and/or the like, with the unique attribute information stored on the edge server or elsewhere on the network. At block 206, the method 200 comprises generating a session key when the UE has authorization to the local APN, wherein the session key comprises an application key that validates a connection between the edge server and the UE. The session key, in some embodiments, is generated by the edge server, while in other embodiments the session key may be generated by or in conjunction with other network components such as a mobility management entity, home subscriber server, or other components of the network. At block 208, the method 200 comprises sending the session key to the UE. At block 210, the method 200 comprises receiving a request to access content of an application on a content server, such as a content server 130, from the UE, wherein the request comprises encrypted information based on the application key. At block 212, the method 200 comprises decrypting the encrypted information of the request to obtain a key.

At block 214, the method 200 comprises comparing the key to the application key previously generated by the edge server and sent to the UE to validate the UE. At block 216, the method 200 comprises verifying a plurality of identifiers of the UE when the UE is valid. At block 218, the method 200 comprises identifying the application on the content server to obtain the content based on the request. At block 220, the method 200 comprises encrypting and sending a session identifier to the UE based on a new application key. At block 222, the method 200 comprises serving the content from the instance of the application on the content server through to the UE according to the session identifier.

Figure 3:
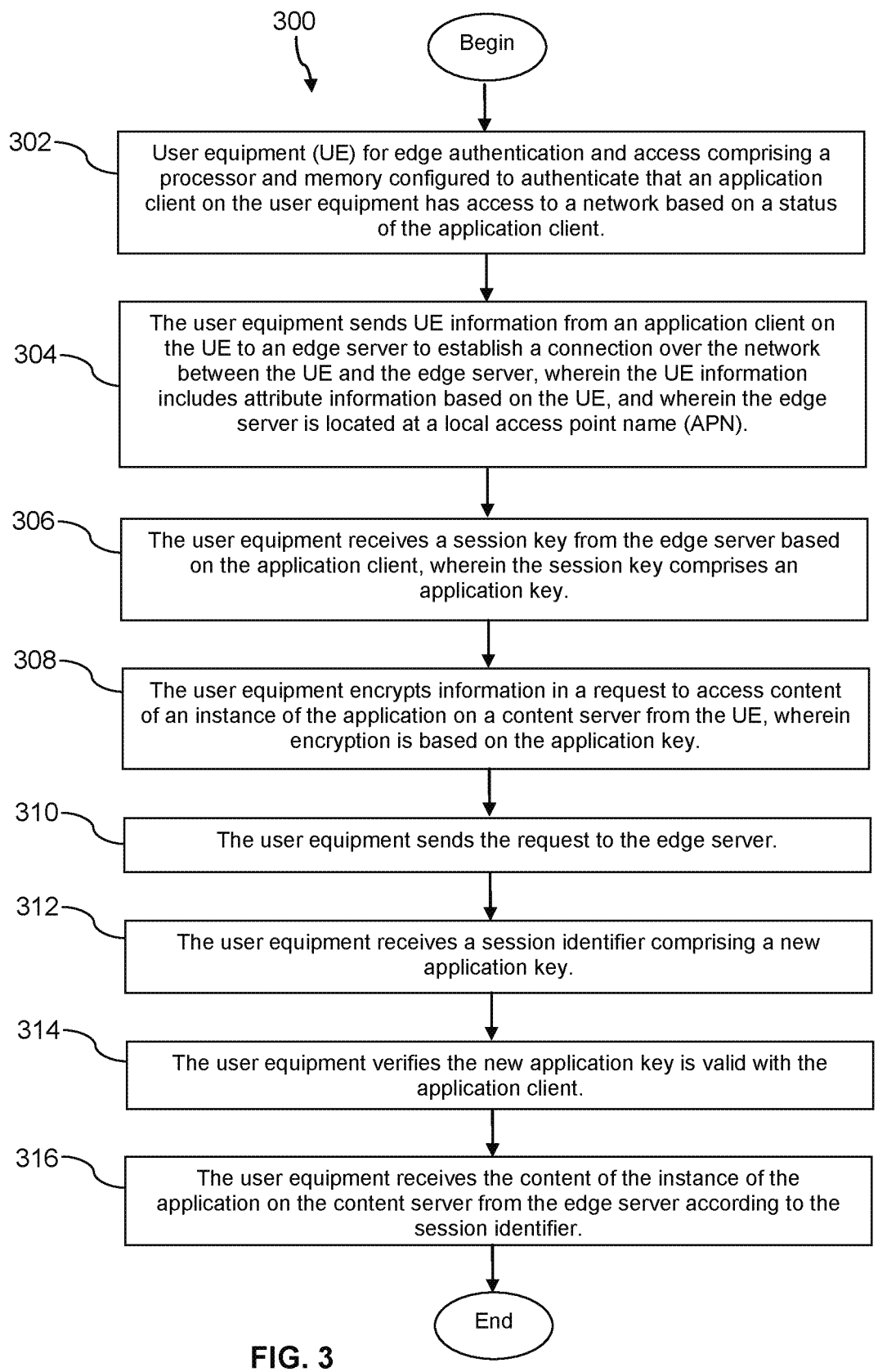
FIG. 3 is a flow chart of UE according to an embodiment of the disclosure.

FIG. 3 depicts UE for edge authentication and access 300. At block 302, the UE 300 authenticates that an application client on the UE has authorization to a network based on a status of the application client. At block 304, the UE 300 further sends UE information from an application client on the UE to an edge server to establish a connection over the network between the UE and the edge server, wherein the UE information includes attribute information based on the UE, and wherein the edge server is located at a local APN.

At block 306, the UE 300 receives a session key from the edge server based on the application client, wherein the session key comprises an application key. At block 308, the UE 300 encrypts information in a request to access content of an instance of the application on a content server from the UE, wherein encryption is based on the application key. At block 310, the UE 300 sends the request to the edge server. At block 312, the UE 300 receives a session identifier comprising a new application key. At block 314, the UE 300 verifies the new application key is valid with the application client. At block 316, the UE 300 receives the content of the instance of the application on the content server from the edge server according to the session identifier.

Figure 4A:
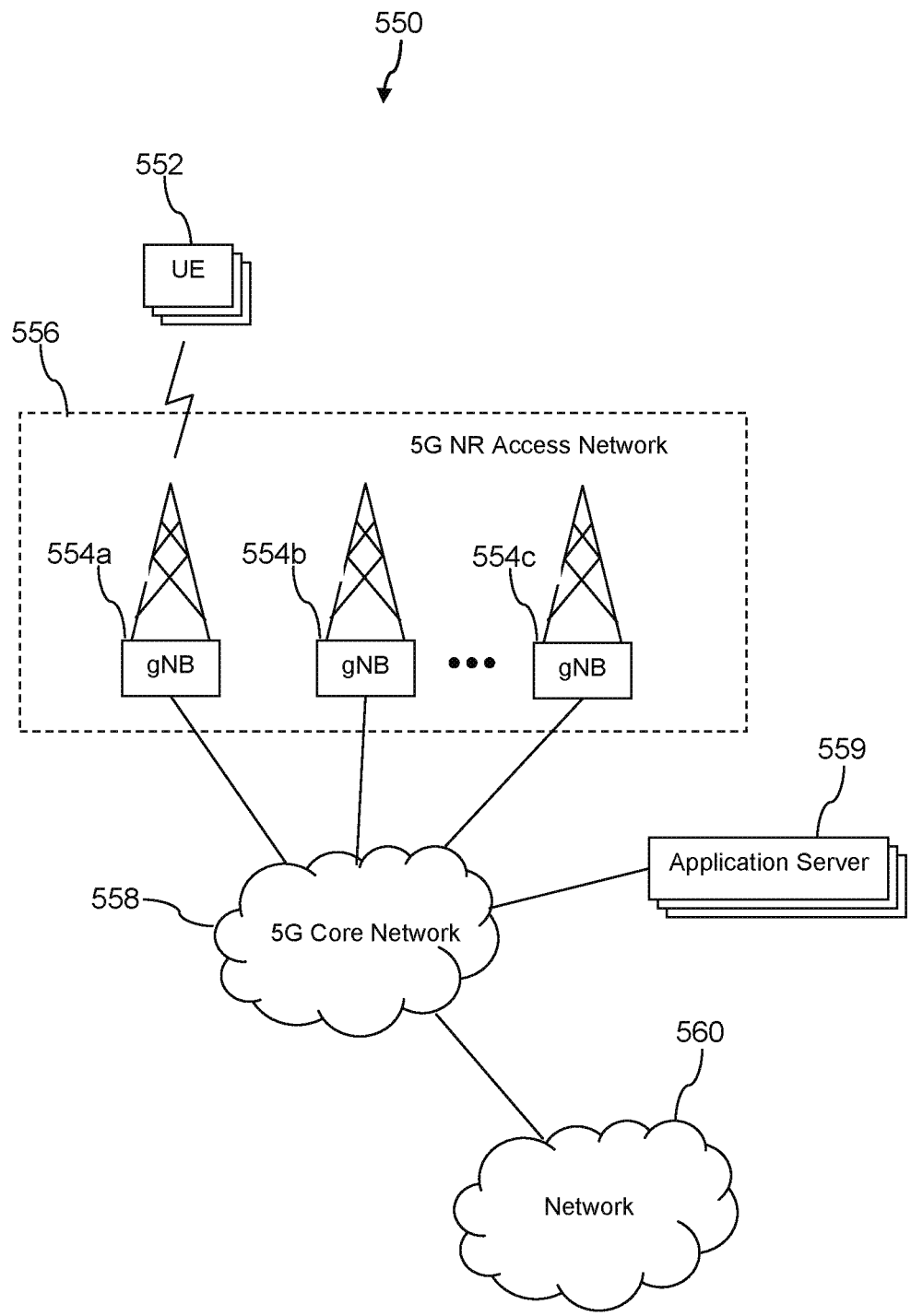
FIG. 4A is a block diagram of a communication system according to an embodiment of the disclosure.

Turning now to FIG. 4A, an exemplary communication system 550 is described. In an embodiment, at least parts of the system 100 are implemented in accordance with the system 550 described with reference to FIG. 4A and FIG. 4B. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or transport networks 560, such as the public switched telephone network (PSTN) and/or the Internet for instance. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 10 gigabits per second (gbps) downlink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

Figure 4B:
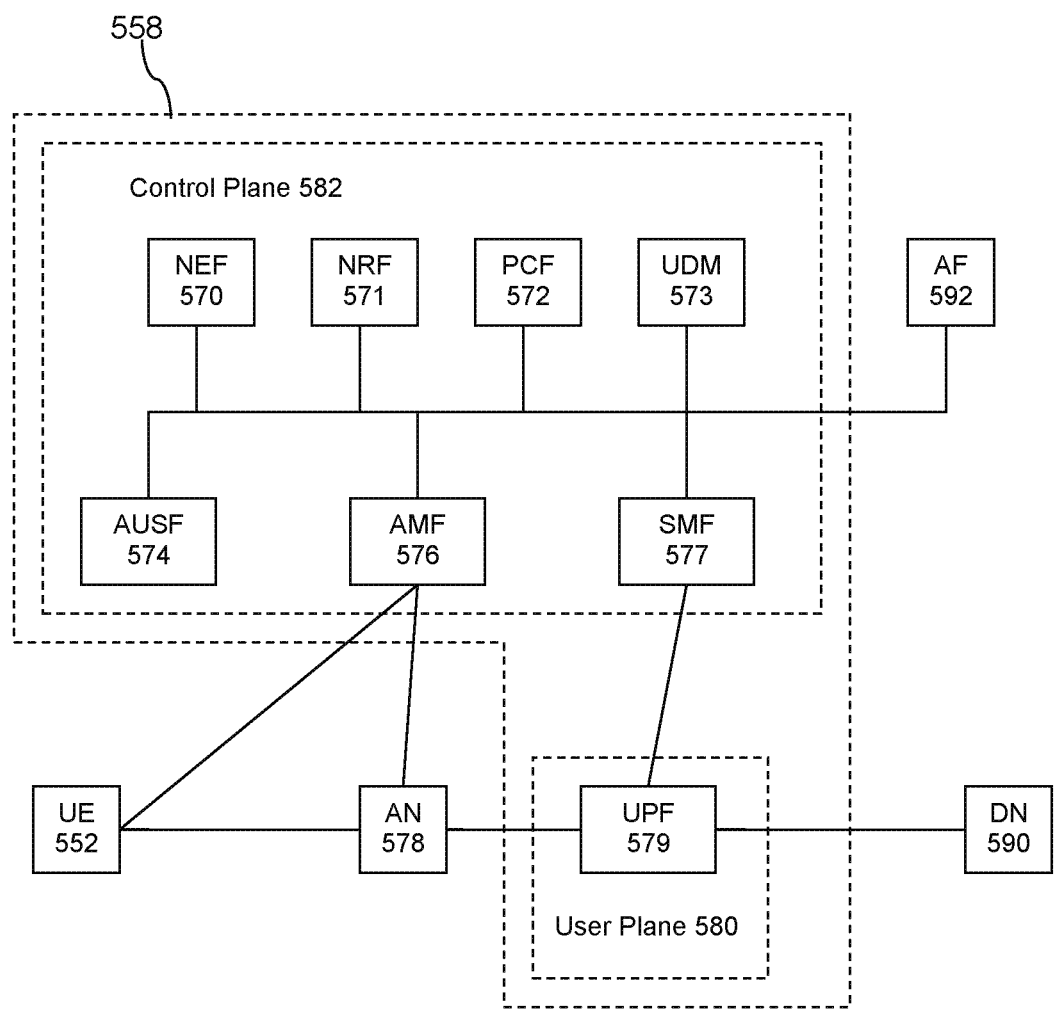
FIG. 4B is a block diagram of a communication system according to an embodiment of the disclosure.

Turning now to FIG. 4B, further details of the core network 558 are described. In an embodiment, the core network 558 is a 5G core network. 5G core network technology is based on a service based architecture paradigm. Rather than constructing the 5G core network as a series of special purpose communication nodes (e.g., an AMF, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 574, an access and mobility management function (AMF) 576, a session management function (SMF) 577, a network exposure function (NEF) 570, a network repository function (NRF) 571, a policy control function (PCF) 572, a unified data management (UDM) 573, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 4A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 574 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. The core network 558 can provide a network slice to a subscriber, for example an enterprise customer, that is composed of a plurality of 5G network functions that are configured to provide customized communication service for that subscriber, for example to provide communication service in accordance with communication policies defined by the customer.

Figure 5:
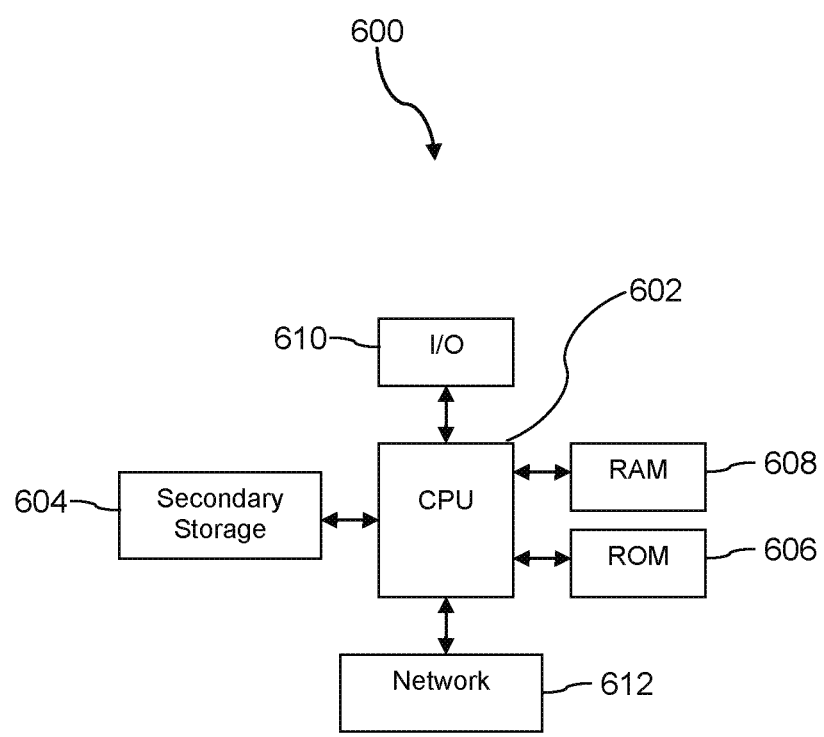
FIG. 5 is a block diagram of a communication system according to an embodiment of the disclosure.

FIG. 5 illustrates a computer system 600 suitable for implementing one or more embodiments disclosed herein. For example, in an embodiment, the edge server 122 and the content server 130 described above may be implemented in a form similar to that of computer system 600. The computer system 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips.

It is understood that by programming and/or loading executable instructions onto the computer system 600, at least one of the CPU 602, the RAM 608, and the ROM 606 are changed, transforming the computer system 600 in part into a particular machine or UE having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or UE, likewise a computer that has been programmed and/or loaded with executable instructions may be viewed as a particular machine or apparatus.

Additionally, after the system 600 is turned on or booted, the CPU 602 may execute a computer program or application. For example, the CPU 602 may execute software or firmware stored in the ROM 606 or stored in the RAM 608. In some cases, on boot and/or when the application is initiated, the CPU 602 may copy the application or portions of the application from the secondary storage 604 to the RAM 608 or to memory space within the CPU 602 itself, and the CPU 602 may then execute instructions that the application is comprised of. In some cases, the CPU 602 may copy the application or portions of the application from memory accessed via the network connectivity devices 612 or via the I/O devices 610 to the RAM 608 or to memory space within the CPU 602, and the CPU 602 may then execute instructions that the application is comprised of. During execution, an application may load instructions into the CPU 602, for example load some of the instructions of the application into a cache of the CPU 602. In some contexts, an application that is executed may be said to configure the CPU 602 to do something, e.g., to configure the CPU 602 to perform the function or functions promoted by the subject application. When the CPU 602 is configured in this way by the application, the CPU 602 becomes a specific purpose computer or a specific purpose machine.

The secondary storage 604 is typically comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution. The ROM 606 is used to store instructions and perhaps data which are read during program execution. ROM 606 is a non-volatile memory device which typically has a small memory capacity relative to the larger memory capacity of secondary storage 604. The RAM 608 is used to store volatile data and perhaps to store instructions. Access to both ROM 606 and RAM 608 is typically faster than to secondary storage 604. The secondary storage 604, the RAM 608, and/or the ROM 606 may be referred to in some contexts as computer readable storage media and/or non-transitory computer readable media.

I/O devices 610 may include printers, video monitors, liquid crystal displays (LCDs), touch screen displays, keyboards, keypads, switches, dials, mice, track balls, voice recognizers, card readers, paper tape readers, or other well-known input devices.

It is understood that by programming and/or loading executable instructions onto the computer system 600, at least one of the CPU 602, the RAM 608, and the ROM 606 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC) or a field programmable gate array (FPGA), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 602 may execute a computer program or application. For example, the CPU 602 may execute software or firmware stored in the ROM 606 or stored in the RAM 608. In some cases, on boot and/or when the application is initiated, the CPU 602 may copy the application or portions of the application from the secondary storage 604 to the RAM 608 or to memory space within the CPU 602 itself, and the CPU 602 may then execute instructions that the application is comprised of. In some cases, the CPU 602 may copy the application or portions of the application from memory accessed via the network connectivity devices 612 or via the I/O devices 610 to the RAM 608 or to memory space within the CPU 602, and the CPU 602 may then execute instructions that the application is comprised of. During execution, an application may load instructions into the CPU 602, for example load some of the instructions of the application into a cache of the CPU 602. In some contexts, an application that is executed may be said to configure the CPU 602 to do something, e.g., to configure the CPU 602 to perform the function or functions promoted by the subject application. When the CPU 602 is configured in this way by the application, the CPU 602 becomes a specific purpose computer or a specific purpose machine.

The secondary storage 604 is typically comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution. The ROM 606 is used to store instructions and perhaps data which are read during program execution. ROM 606 is a non-volatile memory device which typically has a small memory capacity relative to the larger memory capacity of secondary storage 604. The RAM 608 is used to store volatile data and perhaps to store instructions. Access to both ROM 606 and RAM 608 is typically faster than to secondary storage 604. The secondary storage 604, the RAM 608, and/or the ROM 606 may be referred to in some contexts as computer readable storage media and/or non-transitory computer readable media.

I/O devices 610 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 612 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards, and/or other well-known network devices. The network connectivity devices 612 may provide wired communication links and/or wireless communication links (e.g., a first network connectivity device 612 may provide a wired communication link and a second network connectivity device 612 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), Global System for Mobile Communications (GSM), LTE, WI-FI (IEEE 802.11), BLUETOOTH, ZIGBEE, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 612 may enable the processor 602 to communicate with the Internet or one or more intranets. With such a network connection, it is contemplated that the processor 602 might receive information from the network, or might output information to the network in the course of performing the above-described method steps. Such information, which is often represented as a sequence of instructions to be executed using processor 602, may be received from and outputted to the network, for example, in the form of a computer data signal embodied in a carrier wave.

Such information, which may include data or instructions to be executed using processor 602 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 602 executes instructions, codes, computer programs, scripts which it accesses from hard disk, floppy disk, optical disk (these various disk based systems may all be considered secondary storage 604), flash drive, ROM 606, RAM 608, or the network connectivity devices 612. While only one processor 602 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 604, for example, hard drives, floppy disks, optical disks, and/or other device, the ROM 606, and/or the RAM 608 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 600, at least portions of the contents of the computer program product to the secondary storage 604, to the ROM 606, to the RAM 608, and/or to other non-volatile memory and volatile memory of the computer system 600. The processor 602 may process the executable instructions and/or data structures in part by directly accessing the computer program product, for example by reading from a CD-ROM disk inserted into a disk drive peripheral of the computer system 600. Alternatively, the processor 602 may process the executable instructions and/or data structures by remotely accessing the computer program product, for example by downloading the executable instructions and/or data structures from a remote server through the network connectivity devices 612. The computer program product may comprise instructions that promote the loading and/or copying of data, data structures, files, and/or executable instructions to the secondary storage 604, to the ROM 606, to the RAM 608, and/or to other non-volatile memory and volatile memory of the computer system 600.

In some contexts, the secondary storage 604, the ROM 606, and the RAM 608 may be referred to as a non-transitory computer readable medium or a computer readable storage media. A dynamic RAM embodiment of the RAM 608, likewise, may be referred to as a non-transitory computer readable medium in that while the dynamic RAM receives electrical power and is operated in accordance with its design, for example during a period of time during which the computer system 600 is turned on and operational, the dynamic RAM stores information that is written to it. Similarly, the processor 602 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for edge network authentication and access, implemented by an edge server, comprising:
    receiving user equipment (UE) information from an application client executed on a UE to establish a connection between the edge server and the UE, wherein the edge server is located at a local access point name (APN);
    verifying whether the UE has authorization to the local APN based on the UE information;
    generating a session key when the UE has authorization to the local APN, wherein the session key enables access to a radio access network, and wherein the session key comprises an application key that validates the connection between the edge server and the UE and enables the UE to access content from an application on a content server;
    sending the session key to the UE;
    receiving a request to access content of an application on the content server from the UE, wherein the request comprises a key;
    authenticating the UE based on determining that the key matches the application key; and
    in response to authenticating the UE, serving the content from an instance of the application on the content server to the UE according to the session identifier.

2. The method of claim 1, wherein the information in the request comprises encrypted information, and wherein authenticating the UE comprises decrypting the encrypted information of the request to obtain the key.

3. The method of claim 2, wherein the UE information is based on a user data management (UDM) instance.

4. The method of claim 1, where in the application key is a security token.

5. The method of claim 1, wherein generating the session key when the UE has authorization to the local APN further comprises generating the application key based on core access and mobility management function (AMF).

6. The method of claim 1, wherein the UE information comprises an Internet Protocol (IP) address of the UE, and wherein the request is a Hypertext Transfer Protocol Secure (HTTPS) Uniform Resource Locator (URL) comprising an IP address.

7. The method of claim 6, wherein verifying the identifiers of the UE further comprising verifying the IP address from the request with the IP address from the UE.

8. An edge server, comprising:
    at least one processor;
    a non-transitory memory; and
    an edge server application stored in the non-transitory memory that, when executed by the at least one processor:
        receives user equipment (UE) information from an application client on a UE to establish a connection between the edge server and the UE, wherein the edge server is located at a local access point name (APN);
        verifies whether the UE has authorization to the local APN based on the UE information;
        generates a session key when the UE has authorization to the local APN, wherein the session key enables access to a radio access network, and wherein the session key comprises an application key that validates the connection between the edge server and the UE and enables the UE to access content from an application on a content server;
        sends the session key to the UE;
        receives a request to access content of an application on the content server from the UE, wherein the request comprises a key;
        authenticates the UE based on determining that the key matches the application key; and
        in response to authenticating the UE, serves the content from an instance of the application on the content server to the UE according to the session identifier.

9. The edge server of claim 8, wherein the edge server application further receives the UE information from a plurality of application clients, and wherein the application key applies to each of the application clients.

10. The edge server of claim 9, wherein the UE information is based on a user data management (UDM) instance.

11. The edge server of claim 8, wherein the application key is a security token.

12. The edge server of claim 8, wherein the edge server application further generates the session key when the UE has authorization to the local APN, further cause the processor to be configured to generate the application key based on core access and mobility management function (AMF).

13. The edge server of claim 8, wherein the UE information comprises an Internet Protocol (IP) address of the UE, and wherein the request is a Hypertext Transfer Protocol Secure (HTTPS) Uniform Resource Locator (URL) comprising an IP address.

14. The edge server of claim 13, wherein the edge server application further verifies the identifiers of the UE, further cause the processor to be configured to verify the IP address from the request with the IP address from the UE.

15. User equipment (UE) for edge authentication and access, comprising:
- a processor; and
- a non-transitory comprising instructions that, when executed by the processor:
  - validates an application client on the UE;
  - sends UE information from the application client on the UE to an edge server to establish a connection over the network between the UE and the edge server, wherein the edge server is located at a local access point name (APN);
  - receives a session key from the edge server based on the application client, wherein the session key enables access to a radio access network, and wherein the session key comprises an application key that enables the UE to access content from an application on a content server;
  - sends a request to the edge server to access content of an instance of the application on the content server, the request comprising a key, wherein the key is compared to the application key by the edge server in order to authenticate the UE; and
  - in response to authentication of the UE, receives the content of the instance of the application on the content server from the edge server according to the session identifier.

16. The UE of claim 15, wherein the network is a 3rd Generation Partnership Project (3GPP) network.

17. The UE of claim 15, wherein the status is a version of the application client.

18. The UE of claim 15, wherein the application key is a security token.

19. The UE of claim 15, wherein the UE information comprises an Internet Protocol (IP) address of the UE, and wherein the request is a Hypertext Transfer Protocol Secure (HTTPS) Uniform Resource Locator (URL) comprising the IP address.

20. The UE of claim 15, wherein the instructions, when executed by the processor, encrypt the request prior to sending the request to the edge server.

* * * * *